(No Model.)

J. S. HILLIARD.
ODOMETER.

No. 448,716. Patented Mar. 24, 1891.

Witnesses:
Hermann Bormann
Thomas M. Smith

Inventor:
John S. Hilliard
by J. Walter Douglass
Att'y

UNITED STATES PATENT OFFICE.

JOHN S. HILLIARD, OF PHILADELPHIA, PENNSYLVANIA.

ODOMETER.

SPECIFICATION forming part of Letters Patent No. 448,716, dated March 24, 1891.

Application filed November 24, 1890. Serial No. 372,446. (No model.)

*To all whom it may concern:*

Be it known that I, JOHN S. HILLIARD, a citizen of the United States, residing at the city of Philadelphia, in the county of Philadelphia and State of Pennsylvania, have invented certain new and useful Improvements in a Combined Cyclometer and Time-Piece, of which the following is a specification.

My invention relates to a combined instrument for recording the distance traversed by a vehicle—such, for example, as a bicycle or tricycle—and for indicating time.

The principal objects of my present invention are, first, to provide a simple, compact, and comparatively inexpensive instrument comprising a combined cyclometer and clock, and especially adapted for attachment to the front fork of a bicycle or tricycle beneath the steering-head thereof, so as to be in plain sight of the rider at all times, and, second, to provide simple and efficient means for imparting motion to the combined instrument from the periphery of the driving-wheel instead of from the center or from the axle thereof.

My invention consists of a device constructed, arranged, and adapted for operation in the manner hereinafter described, and pointed out in the claims.

The nature and objects of my present invention will be more fully understood from the following description, taken in connection with the accompanying drawings, forming part hereof, and in which—

Figure 1:
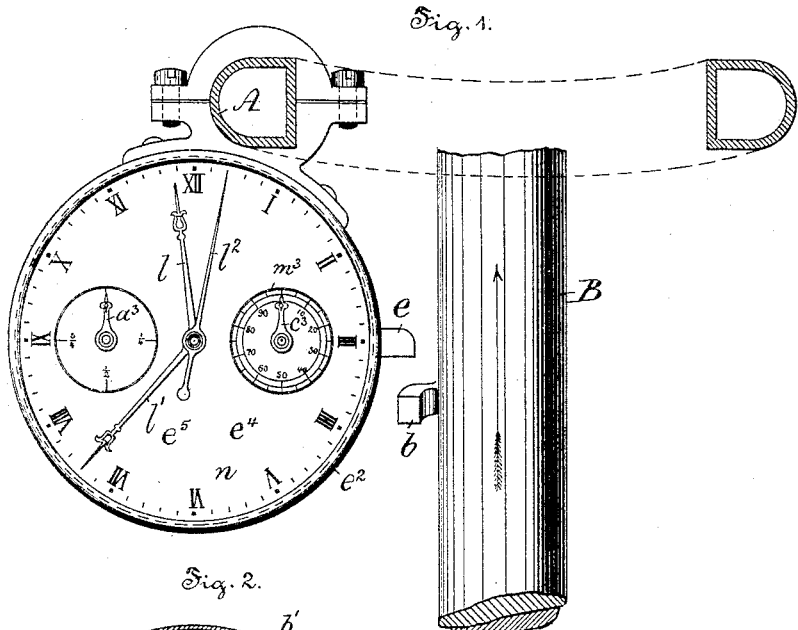
Figure 2:
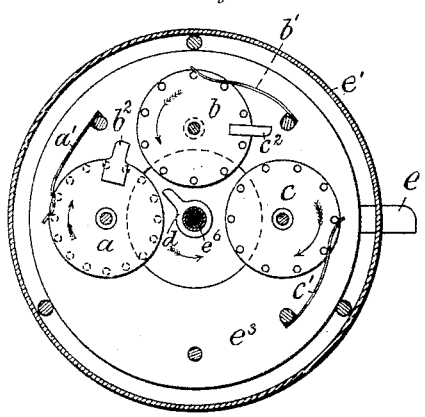
Figure 4:
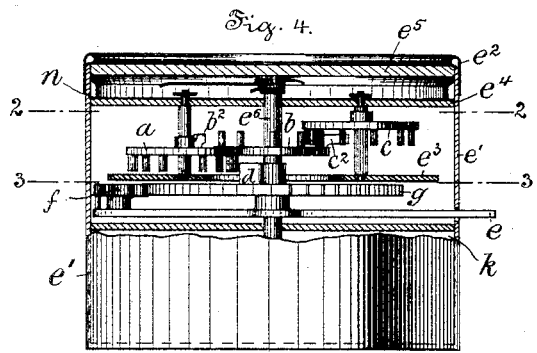
Figure 3:
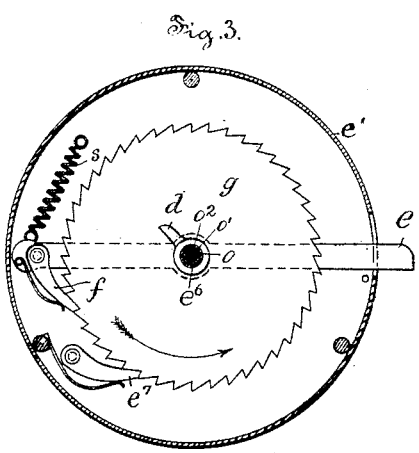

Figure 1 is a top or plan view, partly in section, of portions of the front fork and front wheel of a bicycle or tricycle or other type of velocipede, showing the combined cyclometer and clock attached to the front fork above the periphery of the wheel and occupying an unobstructed position in the sight of the rider at all times. Fig. 2 is a horizontal section on the line 2 2 of Fig. 4. Fig. 3 is a similar sectional view on the line 3 3 of Fig. 4; and Fig. 4 is a side view, partly in central section, of Fig. 1.

In the drawings, A is the front fork of a bicycle, tricycle, or other type of velocipede.

B is the tire of the driving or pilot wheel thereof.

$h$ is a lug or projection attached to and extending laterally from the tire of the wheel B and adapted to contact with and operate the lever $e$ once in each revolution of the wheel B, for a purpose to be presently fully described.

$e'$ is a case or housing provided with a cap $e^2$, a face $e^4$, a glass cover $e^5$, and a partition $e^3$, having the central portion thereof cut away.

$e^6$ is a sleeve secured to the face $e^4$ and partition $e^3$. This sleeve carries the lever $e$ and also an operating ratchet-wheel $g$, provided with a finger $d$, extending through the central portion of the partition $e^3$. This lever $e$ is held normally in position by means of a spring $s$, attached thereto and to the housing.

$f$ is a spring-actuated pawl attached to the lever $e$ and adapted to engage with and advance one tooth of the operating ratchet-wheel $g$ at each reciprocation of the lever, and consequently at each revolution of the wheel B.

$e^7$ is a detent adapted to engage the teeth of the wheel $g$ in order to prevent the same from being accidentally or otherwise turned backward.

$a$ is a crown-wheel normally retained in position by means of a detent $a'$ and adapted to mesh with the finger $d$, and to be advanced thereby one tooth for each revolution of the ratchet-wheel $g$.

$a^3$ is an index or pointer attached to and moving with the arbor carrying the crown-wheel $a$.

$b$ is an idle crown-wheel normally retained in position by a detent $b'$ and adapted to mesh with a single tooth $b^2$, projecting radially from the wheel $a$.

$c$ is a crown-wheel normally retained in position by means of a detent $c'$ and adapted to mesh with a single tooth $c^2$, projecting radially from the idle-wheel $b$.

$c^3$ is an index or pointer attached to and moving with the arbor carrying the crown-wheel $c$.

$l$, $l'$, and $l^2$ are respectively the hour, minute, and second hands of a clock, of which the works are contained in a receptacle $k$, formed in the housing $e'$ and located in rear of the partition $e^3$, and the respective hands exposed to view are caused to traverse the dial $n$ in the usual manner by means of the arbor and sleeves $o$, $o'$, and $o^2$, passing through the sleeve $e^6$.

In practice the number of teeth upon the ratchet-wheel $g$ will depend upon the diameter of the wheel B, the object being to cause the ratchet-wheel $g$ to revolve once for each sixteenth of a mile traversed by the vehicle.

In the present instance, by reference to the drawings, it is to be assumed that the diameter of the wheel B is thirty inches. Consequently the ratchet-wheel $g$ is provided with forty-four (44) teeth. It should, however, be borne in mind that if a larger or smaller vehicle-wheel is employed a correspondingly different ratchet-wheel $g$ must be employed. The crown-wheel $a$ is provided with sixteen teeth, and consequently is advanced one tooth for each sixteenth of a mile traversed by the vehicle, and makes one complete revolution for each mile traversed thereby, and the index or pointer $a^3$ indicates the distance traversed in quarter, half, and three-quarter miles upon the dial $n^3$. The idle-wheel $b$ is provided with ten teeth or pins and is advanced one tooth for every mile traversed by the vehicle, so that the same makes one complete revolution for every ten miles traversed by the vehicle. The crown-wheel $c$ is advanced one tooth for each revolution of the idle-wheel $b$, and consequently for each ten miles traversed by the vehicle, and the index or pointer $c^3$ will indicate the distance traversed in multiples of ten miles upon the dial $m^3$, whereby the rider may readily ascertain the distance gone and the time consumed in going that distance by simply inspecting the dials. It may be remarked that the idle-wheel $c$ causes both of the indices or pointers to revolve in the same direction, thus facilitating the operation of reading the distance traversed on the cyclometer.

In cases where a greater number of miles than one thousand is to be recorded an additional wheel driven by an idle-wheel may be employed. This duplication of the wheels, it will be readily understood, may be extended as required.

It will be obvious to those skilled in the art to which my invention appertains that the distance traversed by a vehicle may be recorded in tenths or in any other preferred fractions of miles instead of in sixteenths without departing from the spirit thereof.

Having thus described the nature and objects of my invention, what I claim as new, and desire to secure by Letters Patent, is—

1. A combined cyclometer and clock provided with dials, indices, and hands comprising a housing adapted to contain a train of recording-wheels actuating the indices, mechanism, as described, for actuating the hands, a sleeve communicating with the interior of said housing, a ratchet-wheel mounted on the sleeve and provided with a finger meshing with one of the train of wheels, a spring-actuated lever mounted on said sleeve and provided with a pawl engaging said ratchet-wheel, and arbors passing through said sleeve and attached to said hands, substantially as shown and described.

2. The combination of a housing provided with dials, a train of recording-wheels mounted on arbors, indices attached to said arbors, a sleeve, a ratchet-wheel mounted on a shaft and provided with a finger engaging one of said train of wheels, a lever mounted on said shaft and provided with a spring-actuated pawl engaging said ratchet-wheel, and a spring attached to said lever and housing, substantially as shown and described.

3. The combination of a housing provided with dials, a train of recording-wheels comprising crown-wheels provided with an extra tooth or dog, indices attached to certain of said crown-wheels, a sleeve, a ratchet-wheel provided with a finger, a spring-controlled lever protruding through said housing and mounted on said sleeve, and a pawl attached to said lever and adapted to engage said ratchet-wheel, substantially as shown and described.

4. The combination, with the front fork and wheel of a bicycle, tricycle, or velocipede, of a lug attached to said wheel, a housing attached to said fork and provided with dials, a train of recording-wheels and indices therefor, a sleeve, a ratchet-wheel for actuating said train of wheels, and a spring-controlled lever mounted on said sleeve and having one extremity protruding through said housing and adapted to contact with said lug and having the other extremity provided with a pawl, substantially as and for the purposes set forth.

5. The combination of a vehicle-wheel provided with a lug, a stationary housing provided with dials, a train of recording-wheels and indices, a sleeve, a ratchet-wheel for actuating said train, a spring-controlled lever mounted on said sleeve and adapted to contact with said lug at each revolution of the wheel, and a pawl attached to said lever and adapted to engage said ratchet-wheel, substantially as and for the purposes set forth.

In witness whereof I have hereunto set my signature in the presence of two witnesses.

JOHN S. HILLIARD.

Witnesses:
THOMAS M. SMITH,
RICHARD C. MAXWELL.